United States Patent
Prasad

(10) Patent No.: US 8,708,642 B2
(45) Date of Patent: Apr. 29, 2014

(54) STABLE WIND POWER TURBINE

(76) Inventor: Romeo Prasad, Windsor, CT (US)

( * ) Notice: Subject to any disclaimer, the term of this patent is extended or adjusted under 35 U.S.C. 154(b) by 975 days.

(21) Appl. No.: 12/762,432

(22) Filed: Apr. 19, 2010

(65) Prior Publication Data

US 2010/0264654 A1  Oct. 21, 2010

Related U.S. Application Data

(60) Provisional application No. 61/212,887, filed on Apr. 17, 2009, provisional application No. 61/275,807, filed on Sep. 3, 2009.

(51) Int. Cl.
*F03D 7/02* (2006.01)
*F03B 15/06* (2006.01)

(52) U.S. Cl.
USPC ............................................ 415/4.5; 415/908

(58) Field of Classification Search
USPC ............... 415/4.1, 4.3, 4.5, 905, 908; 416/62, 416/228, 235, 236 R, 144
See application file for complete search history.

(56) References Cited

U.S. PATENT DOCUMENTS

| 2,517,135 | A | * | 8/1950 | Rudisill | 290/44 |
| 4,035,658 | A | * | 7/1977 | Diggs | 290/55 |
| 4,329,115 | A | * | 5/1982 | Kress | 416/11 |
| 4,340,822 | A | * | 7/1982 | Gregg | 290/55 |
| 4,362,469 | A | * | 12/1982 | van Holten | 416/191 |
| 6,800,956 | B2 | * | 10/2004 | Bartlett | 290/55 |
| 6,824,348 | B2 | * | 11/2004 | Alexander et al. | 415/4.2 |
| 2006/0216153 | A1 | * | 9/2006 | Wobben | 416/241 A |
| 2007/0241566 | A1 | * | 10/2007 | Kuehnle | 290/53 |

* cited by examiner

*Primary Examiner* — Nathaniel Wiehe
*Assistant Examiner* — Su Htay
(74) *Attorney, Agent, or Firm* — B J Associates; Bolesh J. Skutnik

(57) ABSTRACT

A new improved compact wind power turbine with multiple turbine blades and an isolated arrow point stationary nose is presented. Turbine blades (rotors) are connected to a circular cage, and at the center of the turbine, the isolated arrow point stationary nose points forward. Each turbine blade has a 90 degree right angle fin connected to its tip for capturing the force of the wind that applies to the blade tip, which otherwise spills over, reducing wind force and creating turbulence at the tip. The captured wind at the blade tip increases the rotational force on the turbine blades creating a greater rotational force than on other market-available wind turbines. Preferentially, the turbine is directed into the wind either manually, or by using a tail vane or other means for orientating turbine into a wind. A generator or alternator converts the mechanical power into electricity for use at industrial, commercial or home sites.

17 Claims, 5 Drawing Sheets

STABLE WIND POWER TURBINE

CROSS-REFERENCE TO PRIORITY APPLICATION

This application claims the benefit of Provisional U.S. application Ser. No. 61/212,887, filed Apr. 17, 2009 by inventor Romeo Prasad and entitled "Wind Turbine" and Provisional U.S. application Ser. No. 61/275,807, filed Sep. 3, 2009 by inventor Romeo Prasad and entitled "Wind Turbine", each of which are hereby expressly incorporated by reference into this application.

BACKGROUND OF THE INVENTION

1. Field of the Invention

The present invention is directed to a wind power turbine for industrial and home/farm uses with enhanced stability and efficiency. In particular, it deals with a compact wind power turbine with a stationary, frontward pointing nose, isolated from the rotors, and tips for the rotors to capture 'runoff' fluid in operation to provide extra force to the rotors.

2. Prior Art Statement

In a world searching for energy, wind power is a perfect solution. Wind is a renewable source that is environmentally friendly and void of any harmful waste products. It is easily converted into electricity and is available in most parts of the world. Renewable energy is a major issue to which the world is turning, because of two major factors. These are: a desire to produce electric power at lower cost; and to produce it, preferably, with 'zero' pollution.

For many years there has also been an interest to reduce America's and the world's dependence on oil or other fossil fuels for power. Electricity from wind turbines is rising here in the United States and elsewhere often in groups dubbed 'wind farms', usually placed somewhat remotely to civilization, i.e. from where the produced electricity is used.

A wind turbine is a mechanical device that captures the wind's energy and coverts it to electricity. Much attention has been given to improve the efficiency and to lower the cost. Naturally these goals are often in opposition to each other.

There are two main basic types of wind turbines, horizontal axis wind turbines (HAWT) and vertical axis wind turbines (VAWT). HAWT are the primary design for most power generation applications. The deficiencies and advantages of each design differ quite greatly. The present invention is a horizontal-axis wind turbine and thus prior art for HAWT products and designs is most pertinent.

Numerous inventors have proposed improvements for wind turbines or components. Representative ones related generally to the present invention are described below, and compared to problems remaining to be solved.

In U.S. Pat. No. 4,150,301, Bergey, Jr. describes a wind turbine which is self-governing at relatively high fluid velocities. Two sets of turbine blades are used to accomplish this aim. One set has a positive efficiency and the other has a negative efficiency at velocities where self-governing is desired. This system is quite complex and by design loses efficiency as wind speeds grow.

In U.S. Pat. No. 4,021,135, Pedersen et al., a modified wind turbine including a reaction type turbine wheel to more efficiently derive power from the wind stream is described; as well as an augmenter to increase the pressure differential across the turbine by producing a vortex downstream from the turbine. The design includes multiple sectors and rotors vying for wind force as well as complex wiring and designs. Such complexity leads to added costs, and also increases the number and type of failure modes.

Some early discussions on optimum rotor blades for power production included a patent by Baskin et al. (U.S. Pat. No. 4,557,666). The essential design here is commonly used in the large wind farms dotting America, especially those in the Mountain passes in California. It uses large rotors ca. 300 feet diameter and blades having fixed pitch in mid and tip sections. These ultra large are the apparent primary interest in wind power turbine design progress. Many of the problems and limitations of this design are related to the massive size of the towers and blades and provide little or no guidance for compact turbines for industrial or commercial sites as intended with the present invention.

More recently, Stiesdal et al. in U.S. Pat. No. 7,059,833 describes gains to be had by modifying the trailing edge design of rotors, at least over a portion of the blade, by attaching serrated trailing edges to the normal trailing edge of standard wind turbine rotors. In contrast to noise abatement attachments to the trailing edge near the rotor tip, Stiesdal et al. promote a much longer section with blunter angles on the serrations. This patent describes improving efficiency by modifying trailing edges on large, long rotor blades. The specifics presented are for a 62 m (192 foot) diameter rotor. It does not deal with the problem of wind rolling off rotor tips nor effects around the central hub of the turbine.

Wobben, in U.S. Pat. No. 7,540,716, provides improved rotor blades by aerodynamic consideration of the leading and trailing edges of the rotor and special attention to rotor tips. The main point is to have the tip of the rotor curved back towards the trailing edge of the blade. Spill off the end of the rotor tip is thus encouraged.

Small compact wind power turbines are considered in U.S. Pat. No. 7,214,029 by D. Richter. Nose design is discussed, but in the context of a streamlined body with a rounded nose and one or more rotor sets contained within the streamlined body. This type of turbine is indeed small, compact but more resembles the structure of a jet engine than the more typical wind power turbine developed to handle ambient winds on various sites. Richter deals primarily with laminar flow problems and enhancing power from such enclosed rotor systems. The design of nose and tail sections for enhanced power generation provide little guidance for exposed rotor wind turbines and the nose design in particular is in opposition to the problem with exposed rotor systems.

What is still needed is a cost effective, efficient solution for compact wind power turbines as are useful for specific site industrial, commercial or home installations. Areas in the center and at the edges of the turbine rotors could especially benefit from new designs presented in the present invention.

SUMMARY AND OBJECTIVES OF THE INVENTION

It is an object of the present invention to provide a compact, lightweight wind turbine with an ability to capture power from a wider range of wind conditions.

It is another object of the present invention to provide a wind turbine system which is easily adjusted to function well and efficiently for wind conditions peculiar to specific sites of use.

It is a further object of the present invention to provide a system which can generate energy at industrial, commercial, home sites simply and efficiently.

It is yet another object of the present invention to provide a wind turbine with front facing point to better split/distribute wind onto the rotors of the turbine.

It is still further object of the present invention to provide tips for wind turbine rotor blade tips to capture wind energy which normally simply slides off blade surfaces and reduces efficiency of the system.

Briefly stated the present invention provides a new improved compact wind power turbine with multiple turbine blades and an isolated arrow point stationary nose. Turbine blades (rotors) are connected to a circular cage, and at the center of the turbine, the isolated arrow point stationary nose points forward. Each turbine blade has a 90 degree right angle fin connected to its tip for capturing the force of the wind that applies to the blade tip, which otherwise spills over, reducing wind force and creating turbulence at the tip. The captured wind at the blade tip increases the rotational force on the turbine blades creating a greater rotational force than on other market-available wind turbines. Preferentially, the turbine is directed into the wind either manually, or by using a tail vane or other means for orientating turbine into a wind. A generator or alternator converts the mechanical power into electricity for use at industrial, commercial or home sites.

The above, and other, objects, features and advantages of the present invention will become apparent from the following description read in conjunction with the accompanying drawings.

DETAILED DESCRIPTION OF PREFERRED EMBODIMENTS

Figure 1:
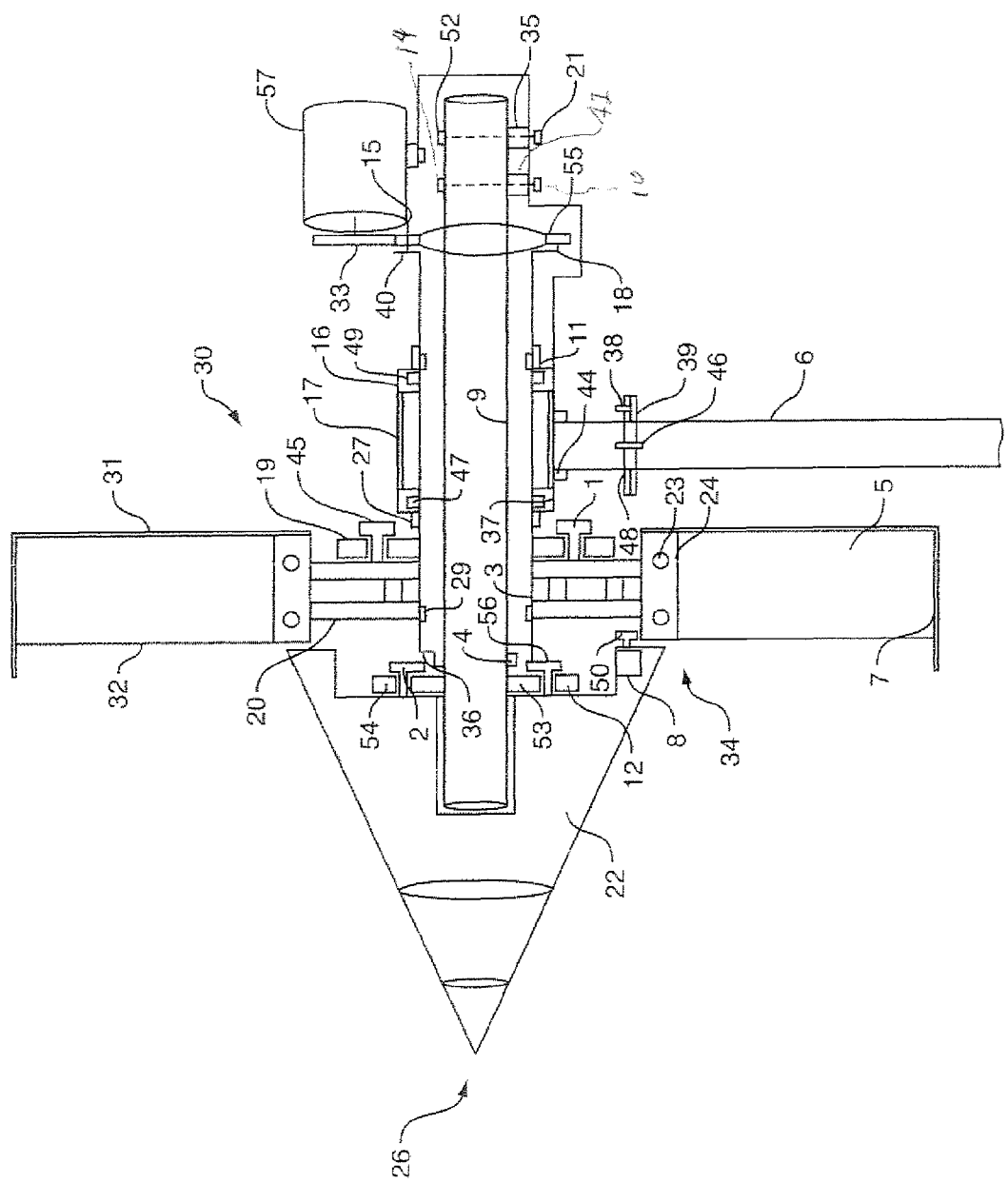
FIG. 1 presents a perspective view of an embodiment of an improved wind turbine system.

In essence, small compact wind power turbines for use in specific industrial, commercial or home sites have been improved for more efficient use of available wind to generate electric power for uses at such sites. The improvements are primarily in the handling of air at the center of the wind turbine and secondly, at the tips of the rotors, but also there are gains in aspects of material selection, design and fabrication.

The key features of the present invention are a stationary arrow pointed nose section, 90 degree perpendicular tips at the end of the rotor blades and material and cost saving design. The arrow pointed nose points forward into the incoming wind, and spreads the wind onto the rotors set behind the nose. Secondly the 90 degree perpendicular tip, securely attached to the blade tip, captures otherwise wasted wind energy by directing wind force onto the rotor tip, which otherwise would just miss or spread to the side off the rotor blade. The perpendicular tips are securely attached to the rotor ends and point towards the wind. Additionally, orienting the wind power turbine system to capture the most force from prevailing winds can be done manually, semi-automatically or remotely, or by design, automatically, whereby a tail vane anchored to the main structure employs the wind to orient the turbine system while in use on top of its tower.

The stationary arrow pointed nose, facing forwards aids the efficiency of the embodiments of the present invention in many ways. First the pointed nose aids in directing wind approaching the turbine system towards the rotors, even when wind direction may be varying in gusts. The arrow point helps make the splitting more efficient. The stationary position of the nose aids in delivering the wind at a useful angle to the leading edges of the rotors. A nose flares as it approaches the main rotor area. Whereas a spinning nose would add rotation to the deflected wind to reduces the direct force of the wind on the rotor blades, the stationary nose of the present invention applies the wind force more directly to the rotor blades. An efficient nose structure permits the design to use a circular cage to mount the rotor blades instead of a solid hub, as the wind can be properly directed out from the center of the structure onto the rotor blade surfaces to capture more of the wind energy.

To reduce the moment of inertia at startup for the rotor blade assembly, among other benefits, each rotor is attached to a circular cage instead of a solid hub. The circular cage is fabricated from a lightweight strong material such as aluminum, titanium, or a high modulus composite material. Each rotor blade is fabricated from materials having the strength and durability required by the end use site. Cost considerations for initial cost, for local availability for replacement material, for environmental conditions, and other job-site specific requirements would also influence selection of material for the rotor blades. Examples include aluminum, fiberglass, other composite materials, wood, lightweight wood or combinations of these. In this way the rotor system can be selected to be as light and durable as possible given the demands of use and the environment of the unit.

The 90 degree right angle tips, like the rotor blades are made from substantially the same material as the rotors. They may be secured to the rotor blade tip/end by a number of means, including locking screws, chemically bonded, or combinations of these. For some materials, they can be integrated into the blade design and formed together with the blade into a unitary piece.

To facilitate keeping the arrow point nose stationary at all times, a counter balance weight is connected inside the lower rear of the nose unit. It is also to be noted that the pointed nose is isolated from the circular cage and rotor blades so that there is no drag on the rotating blades to create frictional losses.

The wind power turbine system is completed with the generator or alternator sub unit to produce electric power from the mechanical action of the spinning rotors. With the addition of an inverter the power output can be integrated into a power grid. With a generator in the system, batteries can be charged to provide storage capacity for 'windless' times.

For maintenance, repairs or emergency situations, the system is equipped with a cable brake system to stop and hold the rotor section from moving. The design of the nose, cage and rotors is such that they can be easily dismantled to handle major repairs, replacement of worn or damaged parts, upgrades or reinstallation at other sites.

A detailed description of preferred embodiments is obtained by referring to the drawings beginning with FIG. 1. There a horizontal-axis wind turbine with multi turbine blades connected to circular cage, in accordance with a preferred, exemplary embodiment of the present invention is presented, improved wind turbine 30. Main end long rotational tubing drive shaft 3 has two outer roller bearings, 47 and 49, one connection each side over main rotational drive shaft 3. Roller bearings 47 and 49 are fixed in place inside the roller bearing housings 16 and 37. Roller bearing housings 16 and 37 are welded in place on top of main support plate 17 or they can be bolted in place with bolts and nuts. Pegs 11 and 27 are fixed in place on main rotational drive shaft 3. One is on each outer side, touching roller bearings 47 and 49 inner ring which prevents the main rotational drive shaft 3 from moving backward or forward. Main drive shaft 3 rear end has a generator drive O' ring 40 welded in place. Step up gear 55 is bolted on. O' ring 40 with two bolts 15 and 18. Step up gear 55 engages with generator pulley gear 33 for rotation.

Main rotational drive shaft 3 is substantially tubular. It has stationary nose shaft 9, that passes through inside without touching main shaft 3, thus preventing drag which would reduce turbine blades rotation. Stationary nose shaft 9 rear end is locked in place to two brackets, 35/42, by bolts 14/52 and nuts 10/21. Stationary nose 22 rear is bolted to a clutch bearing 12 and 54 for reducing friction when the force of the wind blows from different direction and if maintenance is required the nose can be manually rotated.

Clutch bearing 12 is connected to nose O' ring plate 53 with two bolts, 56 and 2. Nose O' ring plate 53 is welded in place to stationary shaft 9. The nose 22 rear center is bolted in place to clutch bearing 12 with two bolts, 2 and 56.

Turbine main support plate 17 is welded in place on top horizontal main upright shaft 44; and adjusting bracket 48 is welded in place on the lower end of upper shaft 44. Adjusting bracket 39 is welded in place on top of lower main horizontal shaft 6. Both adjusting brackets, 39 and 48, sit on top of one another and can manually adjust the turbine blades to point to desired wind direction with adjusting lock bolt 38. Or a tail vane can be connect to the upper horizontal shaft 44 to automatically point the turbine blades to the proper wind direction to receive the force of the wind that blows on the turbine blades for more rotational force.

Circular cage O' ring 19 is welded in place on the front portion of main rotational drive shaft 3. Circular cage 20 is press fit over rotational main drive shaft 3, close fit to O' ring 19 for locking in place with two lock bolts 1 and 45 with washers not shown in diagram. Each turbine blade 5 is connected to the rotational cage bracket 24 and is locked in place with two lock bolts 23. Arrow Point Nose 22 is press fit over nose non-rotational shaft 9 which touches O' ring 21 for locking in place with two locking bolts 2 and 56.

Counter balance weight 8 is locked in place with locking bolt 50 on the lower end of the back of nose 22, as shown in FIG. 1, to keep arrow point nose 22 in stationary position at all times as turbine blades 5 rotate by the force of the wind. Arrow point nose 22 expands the force of wind that blows towards the circular cage 20 area and steers it towards the turbine blades 5 which increases the turbine blades rotational force. Another benefit of arrow point nose 22 is that it does not rotate with the turbine blades. With nose 22 stationary, when the force of the wind is applied to turbine blades 5, the rotational forces on turbine blades 5 increase.

Each turbine blade 5 has a 90 degree right angle fin 7 connected to its tip, by locking screws or can be manufacture in place for capturing the force of the wind that is blowing from different directions and misses the turbine blades tips. Another benefit of the 90 degree right angle fins 7, is as the force of wind is applied to the angled turbine blades 5 to provide rotation force, the wind will spread out like a mushroom and spill over angled turbine blade 5 tips. This will cause the turbine blades to lose pressure and to decrease rotation and torque. With a 90 degree right angle fin connected to the tip, the spillover wind force will be caught which would increase turbine blades rotation force and torque.

Figure 2:
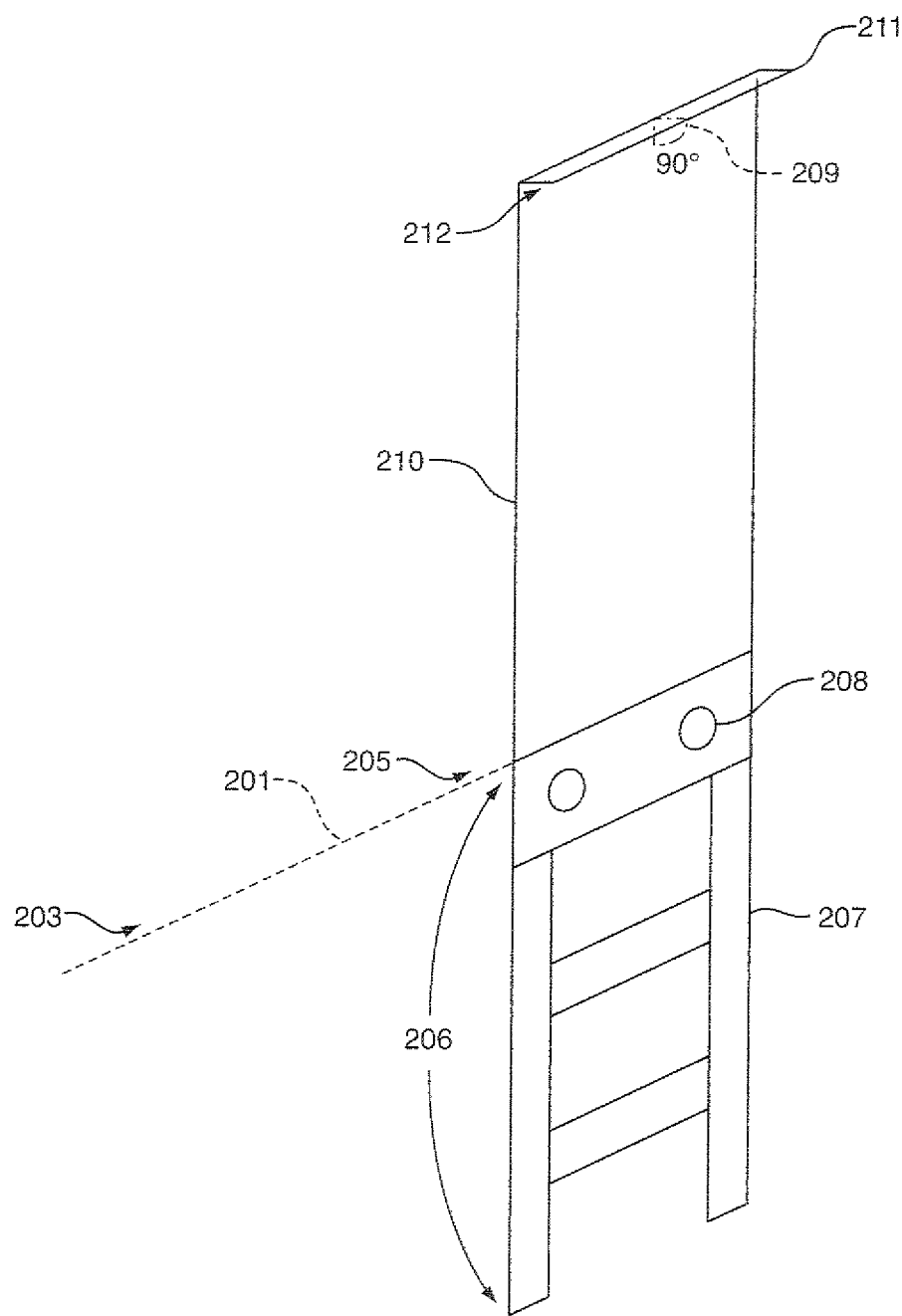
FIG. 2 shows a perspective of an embodiment of an improved wind turbine blade with 90 right angle fin.

Detail for a representative turbine blade is shown in FIG. 2. Working surface 210 of turbine blade 205 is connected to section 206, which overlaps and connects with the circular cage. Section 207 is the open section within the circular cage. Holes 208 are used to join the turbine blade to the circular cage. Blade tip end 212 is connected to rotor blade fin 211 at 90 degree right angle 209.

Figure 3:
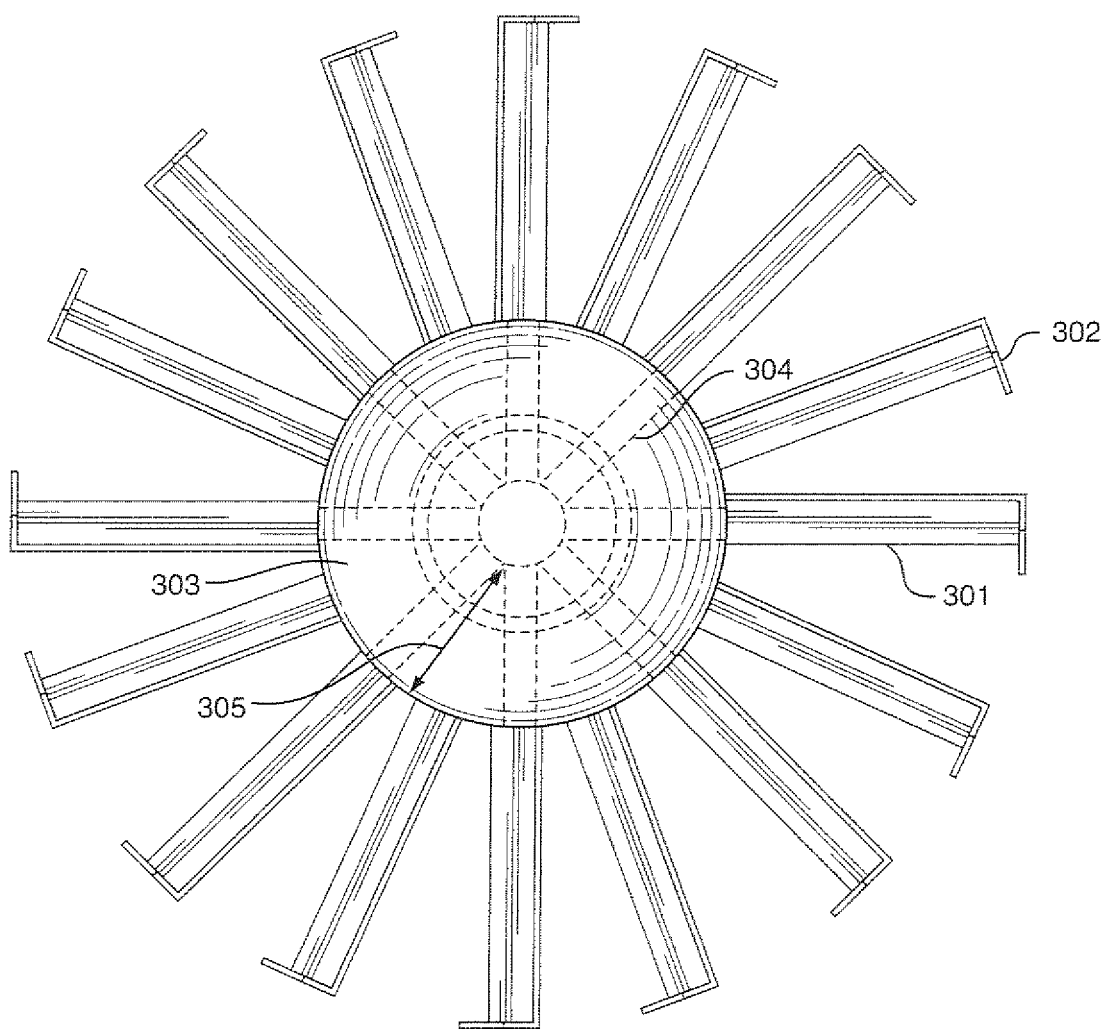
FIG. 3 illustrates, for an embodiment, a perspective front view of circular wind turbine blades.

In FIG. 3, a multi-blade rotor turbine assembly is shown in perspective. Significant components are marked; turbine blade/rotor 301, 90 degree angle blade tip 302, nose cone 303, internal section of turbine blade 304, connected to cage and covered by nose cone; and rough dimension of nose cone radius beyond diameter of the main rotational shaft.

Figure 4:
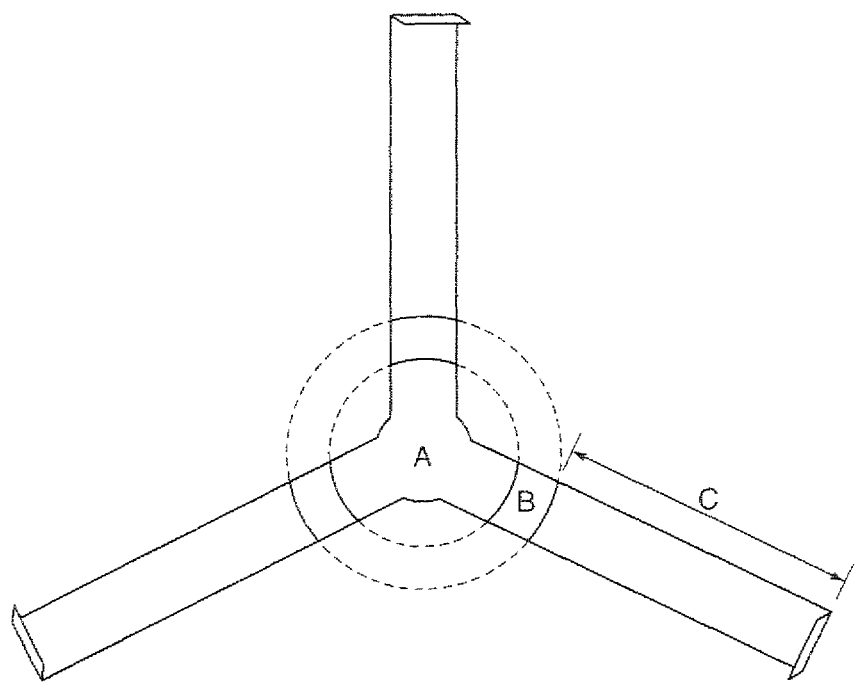
FIG. 4 presents a perspective view of a preferred embodiment of a circular wind turbine blades area.

For the present invention wind Turbine multi blades circular areas identified in FIG. 4, circular area A, main rotational driveshaft area, is an area that transfers the force of the wind to area B, the nose area. In many of the prior art devices/systems, it has been reported that very little or no rotational force was recorded at circular area B, the nose area. The current invention, however, basically captures the force of the wind that blows to circular areas A and B and then transfers it to a circular area formed by the exposed length C of each blade, which increases rotational force and circular area defined by the tip receives a greater rotational force than in prior art devices.

Figure 5:
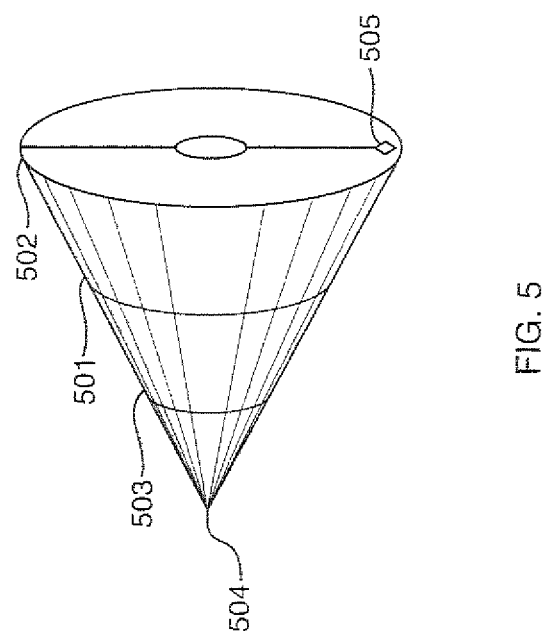
FIG. 5 describes a perspective view of a preferred embodiment of the wind turbine arrow point nose.

The perspective of a preferred embodiment of a nose cone according to the present invention is in FIG. 5. Arrow point 504 is followed by circular area 503 which correlates with roughly circular area A, above. Circular area 501 roughly correlates with circular area B above, with circumference 502 and diameter 505 at the rotor blade end (base) of the nose cone.

Returning to FIG. 1, the force of wind blows towards turbine blades 5 whose edges 32, leading, and 31, trailing, are substantially a knifepoint. The turbine blades are set in an angle to capture the maximum force of the wind. Turbine blades 5 are connected to circular cage 20. Circular cage 20 is connected to main rotational driveshaft 3. Main rotational shaft rear is connected to a generator or alternator 57. As the force of the wind blows on turbine blades 5, they rotate on rotational shaft 3 which is connected to a generator or an alternator to supply power. The generator or alternator 57 can supply power to charge batteries or an inverter can be added to supply power to power-lines (not in diagram)

Having described preferred embodiments of the invention with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. An improved wind power turbine system comprised of a wind turbine having multiple turbine blades connected to a circular cage wherein said circular cage is locked onto a main rotational drive shaft, which is substantially tubular; and said wind turbine having a stationary nose centered, but said stationary nose being isolated from the circular cage; wherein said stationary centered nose is fit onto a nose shaft which passes through inside said rotational drive shaft without touching said drive shaft; and wherein said nose shaft is connected to said wind turbine at said nose shaft's rear end.

2. The improved turbine system according to claim 1, wherein said stationary nose is an arrow point nose that is frontwards pointing.

3. The improved turbine system according to claim 2, wherein said arrow point nose is constructed from aluminum to withstand heavy winds, while being lightweight.

4. The wind turbine system according to claim 2, wherein said arrow point nose has a counter balance weight connected to a lower end of the nose inside the nose for keeping the nose in a stationary position at all times and conditions.

5. The improved turbine system according to claim 1, wherein said circular cage is constructed of a material selected from the group consisting of aluminum, titanium, and composite material to maintain overall lightweight, though strong, wind turbine.

6. The improved turbine system according to claim 5, wherein said material for said circular cage is selected based on wind levels at a site.

7. The improved turbine system according to claim 5, wherein said material for said circular cage is selected on a cost benefit analysis, including safety aspects.

8. The improved turbine system according to claim 1, wherein said turbine blades are constructed of a material selected from the group consisting of aluminum, fiberglass, composite material, wood, and lightweight wood.

9. The improved turbine system according to claim 8, wherein said material for said turbine blades is selected based on wind levels at a site.

10. The improved turbine system according to claim 8, wherein said material for said blades is selected based on maintenance and other cost benefit issues.

11. The improved turbine system according to claim 1, further comprising a 90 degree right angle fin, perpendicular to the long axis of each blade, attached to an outer edge of each of said multiple blades, increasing rotational force by capturing wind force blowing out towards said rotor outer edge of each of said multiple blades and wherein said fin of each blade is pointing forward from said corresponding blade into the wind.

12. The improved turbine system according to claim 11, wherein said fin of each blade is constructed of a material selected from the group consisting of aluminum, fiberglass, composite material, wood, and lightweight wood.

13. The improved turbine system according to claim 1, further comprising a tail vane to aid in self-orienting said turbine blades into the wind.

14. The improved turbine system according to claim 1, further comprising means to manually adjust said turbine blades toward prevailing winds.

15. The improved turbine system according to claim 1, further comprising a generator or an alternator to produce electric power in operation.

16. The improved turbine system according to claim 15, wherein said generator is a charging system with energy stored in batteries.

17. The improved turbine system according to claim 15, further comprising an inverter to allow attachment to an electric power grid.

* * * * *